United States Patent
Maruyama

(10) Patent No.: US 10,558,732 B2
(45) Date of Patent: Feb. 11, 2020

(54) INFORMATION PROCESSING APPARATUS, NON-TRANSITORY COMPUTER READABLE MEDIUM, AND INFORMATION PROCESSING METHOD FOR EXECUTING A FUNCTION COMMON TO TWO ARCHIVE FILES

(71) Applicant: FUJI XEROX CO., LTD., Tokyo (JP)

(72) Inventor: Atsushi Maruyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 71 days.

(21) Appl. No.: 15/345,605

(22) Filed: Nov. 8, 2016

(65) Prior Publication Data
US 2017/0371843 A1 Dec. 28, 2017

(30) Foreign Application Priority Data
Jun. 22, 2016 (JP) .................................. 2016-123286

(51) Int. Cl.
*G06F 17/21* (2006.01)
*G06F 16/93* (2019.01)
*G06F 16/11* (2019.01)
*G06F 17/22* (2006.01)
*G06F 17/24* (2006.01)

(52) U.S. Cl.
CPC .......... *G06F 17/212* (2013.01); *G06F 16/113* (2019.01); *G06F 16/93* (2019.01); *G06F 17/2211* (2013.01); *G06F 17/24* (2013.01)

(58) Field of Classification Search
CPC .............................. G06F 17/212; G06F 16/93
See application file for complete search history.

(56) References Cited

U.S. PATENT DOCUMENTS

| | | | | |
|---|---|---|---|---|
| 7,447,713 B1 * | 11/2008 | Berkheimer | .......... | G06F 9/4488 |
| 7,555,712 B2 * | 6/2009 | Croft | .................. | G06F 17/2211 |
| | | | | 715/247 |
| 7,606,840 B2 * | 10/2009 | Malik | ................... | G06F 16/182 |
| 7,643,682 B2 * | 1/2010 | Bronstein | ........... | G06F 17/2264 |
| | | | | 382/180 |
| 7,761,783 B2 * | 7/2010 | Lahman | ................. | G06F 3/121 |
| | | | | 715/234 |

(Continued)

FOREIGN PATENT DOCUMENTS

| | | |
|---|---|---|
| JP | 2000-035964 A | 2/2000 |
| JP | 2006-243981 A | 9/2006 |

*Primary Examiner* — Scott T Baderman
*Assistant Examiner* — Benjamin Smith
(74) *Attorney, Agent, or Firm* — Oliff PLC

(57) ABSTRACT

An information processing apparatus includes an archive file generation unit and a deriving unit. The archive file generation unit generates multiple archive files each including one or more pieces of document data and information regarding one or more processing functions. The one or more pieces of document data are each associated with the one or more processing functions. The information indicates one or more processes to be executed on the one or more pieces of document data. The deriving unit derives, from the multiple generated archive files, a common processing function among the processing functions that is common to the archive files and a piece of document data among the pieces of document data that is associated with the common processing function.

4 Claims, 19 Drawing Sheets

(56) References Cited

U.S. PATENT DOCUMENTS

| | | | | |
|---|---|---|---|---|
| 7,921,354 | B2* | 4/2011 | Tokie | G06F 16/93 715/229 |
| 7,996,367 | B2* | 8/2011 | Foygel | G06Q 50/18 707/668 |
| 8,032,824 | B2* | 10/2011 | Croft | G06F 17/2211 715/229 |
| 8,539,004 | B2* | 9/2013 | Foygel | G06Q 50/18 707/608 |
| 8,762,827 | B2* | 6/2014 | Spradley | G06F 16/93 715/208 |
| 8,788,509 | B2* | 7/2014 | Ruellan | G06F 17/2247 707/737 |
| 9,098,432 | B1* | 8/2015 | Bachu | G06F 11/1076 |
| 9,183,321 | B2* | 11/2015 | Murthy | G06F 17/2247 |
| 9,390,099 | B1* | 7/2016 | Wang | G06F 16/1744 |
| 9,465,801 | B2* | 10/2016 | Tripathi | G06F 16/93 |
| 9,594,757 | B2* | 3/2017 | Morimoto | G06Q 50/18 |
| 9,852,337 | B1* | 12/2017 | van Rotterdam | G06F 16/93 |
| 10,097,631 | B2* | 10/2018 | Tevosyan | H04L 67/1095 |
| 2002/0046081 | A1* | 4/2002 | Albazz | G06Q 10/0639 705/7.38 |
| 2005/0091027 | A1* | 4/2005 | Zaher | G06F 17/2229 703/22 |
| 2005/0240858 | A1* | 10/2005 | Croft | G06F 17/2211 715/229 |
| 2006/0010103 | A1* | 1/2006 | Malik | G06F 16/182 |
| 2006/0136545 | A1* | 6/2006 | Reistad | G06Q 30/02 709/200 |
| 2006/0259854 | A1* | 11/2006 | Walker | G06F 17/2229 715/234 |
| 2006/0282769 | A1* | 12/2006 | Bronstein | G06F 17/2264 715/236 |
| 2007/0038492 | A1* | 2/2007 | Ryan | G06F 8/10 705/7.26 |
| 2007/0198533 | A1* | 8/2007 | Foygel | G06Q 10/10 |
| 2007/0211293 | A1* | 9/2007 | Komamura | G06F 16/93 358/1.18 |
| 2007/0260651 | A1* | 11/2007 | Pedersen | G06F 16/30 |
| 2008/0091693 | A1* | 4/2008 | Murthy | G06F 17/2247 |
| 2008/0178067 | A1* | 7/2008 | Lahman | G06F 3/121 715/200 |
| 2009/0193331 | A1* | 7/2009 | Croft | G06F 17/2211 715/255 |
| 2010/0257141 | A1* | 10/2010 | Monet | G06F 16/93 707/665 |
| 2010/0332971 | A1* | 12/2010 | Spradley | G06F 16/93 715/234 |
| 2011/0145693 | A1* | 6/2011 | Mutic | G06F 19/321 715/233 |
| 2011/0264995 | A1* | 10/2011 | Foygel | G06Q 10/10 715/234 |
| 2012/0215792 | A1* | 8/2012 | Lee | G06F 16/903 707/749 |
| 2013/0096934 | A1* | 4/2013 | Vaccaro | G06F 19/00 705/2 |
| 2013/0179774 | A1* | 7/2013 | Wang | G06F 17/22 715/234 |
| 2013/0198143 | A1* | 8/2013 | Matsumoto | G06F 16/9574 707/661 |
| 2013/0268518 | A1* | 10/2013 | Lee | G06F 16/24578 707/722 |
| 2014/0047028 | A1* | 2/2014 | Buth | G06F 9/546 709/204 |
| 2014/0068423 | A1* | 3/2014 | Nakashima | G06F 17/24 715/243 |
| 2014/0214758 | A1* | 7/2014 | Tripathi | G06F 16/93 707/608 |
| 2014/0218545 | A1* | 8/2014 | Matsushita | H04N 1/32128 348/207.1 |
| 2014/0280167 | A1* | 9/2014 | Ghessassi | G06K 9/00483 707/738 |
| 2015/0121199 | A1* | 4/2015 | Wu | G06F 17/2247 715/239 |
| 2015/0269503 | A1* | 9/2015 | Ahari | G06Q 10/0633 705/7.27 |
| 2015/0271148 | A1* | 9/2015 | Ahari | G06Q 10/0633 713/153 |
| 2015/0310004 | A1* | 10/2015 | Morimoto | G06Q 50/18 707/739 |
| 2016/0217423 | A1* | 7/2016 | Magnan | G06Q 10/103 |
| 2017/0019474 | A1* | 1/2017 | Tevosyan | H04L 67/1095 |
| 2017/0083600 | A1* | 3/2017 | Felderman | G06F 16/93 |
| 2017/0109426 | A1* | 4/2017 | Arora | G06F 16/285 |
| 2017/0116193 | A1* | 4/2017 | Felderman | G06F 16/93 |
| 2018/0165356 | A1* | 6/2018 | Felderman | G06F 16/35 |
| 2018/0204000 | A1* | 7/2018 | Charters | G06F 21/568 |
| 2019/0014173 | A1* | 1/2019 | Tevosyan | H04L 67/1095 |
| 2019/0138581 | A1* | 5/2019 | Nakashima | G06F 17/241 |

* cited by examiner

EXAMPLE DISPLAY SCREEN FOR ARCHIVE FILE 30b

EXAMPLE DISPLAY SCREEN FOR COMMON OPERATION

EXAMPLE DISPLAY SCREEN FOR ARCHIVE FILE 30a

EXAMPLE DISPLAY SCREEN FOR ARCHIVE FILE 30b

EXAMPLE DISPLAY SCREEN FOR ARCHIVE FILE 30d

FIG. 16

| TOOL | PAGE |
|---|---|
| STAMP AS RECEIVED | 2ND PAGE OF ARCHIVE FILE 30c<br>2ND PAGE OF ARCHIVE FILE 30d |

EXAMPLE DISPLAY SCREEN FOR COMMON OPERATION

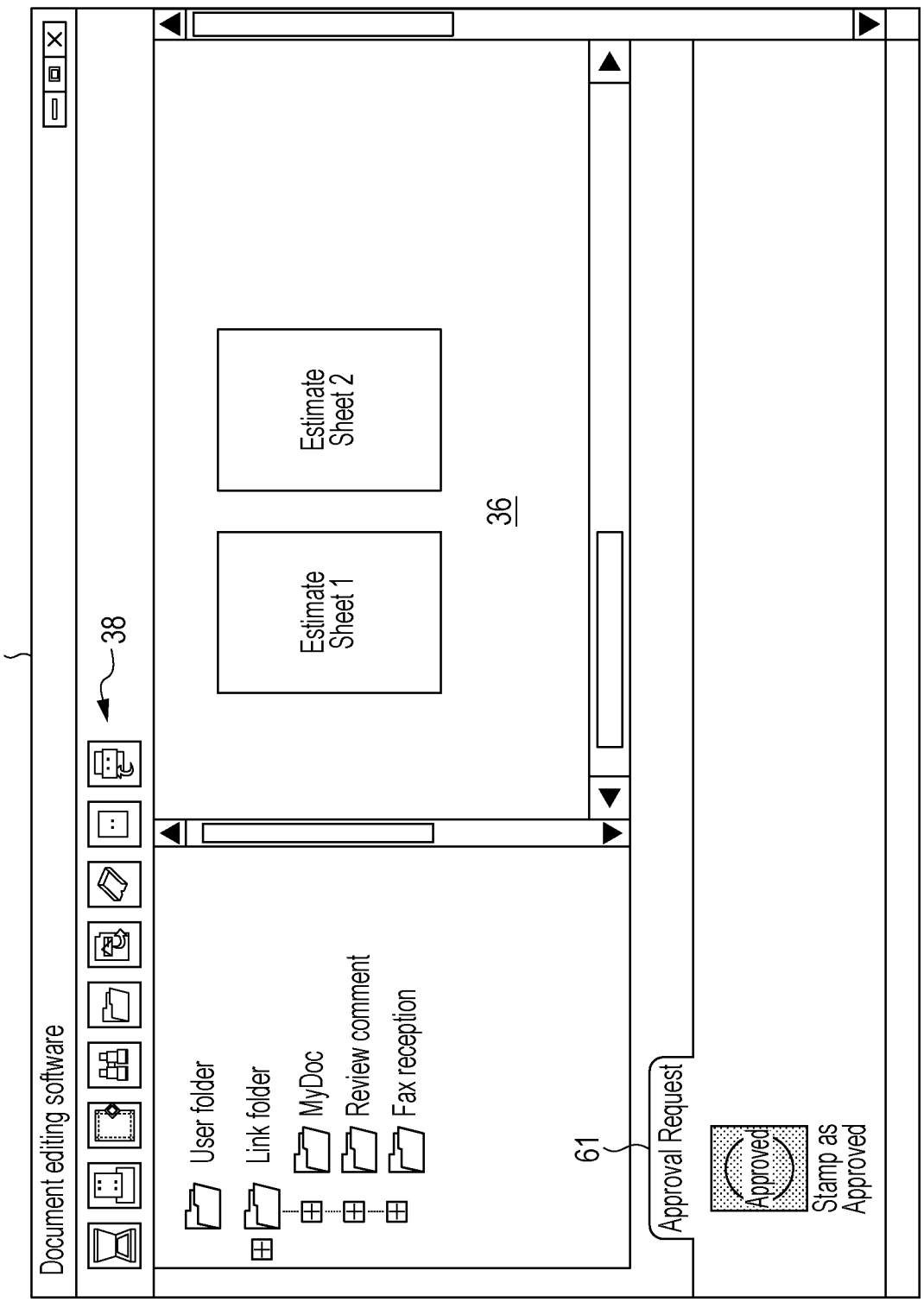

INFORMATION PROCESSING APPARATUS, NON-TRANSITORY COMPUTER READABLE MEDIUM, AND INFORMATION PROCESSING METHOD FOR EXECUTING A FUNCTION COMMON TO TWO ARCHIVE FILES

CROSS-REFERENCE TO RELATED APPLICATIONS

This application is based on and claims priority under 35 USC 119 from Japanese Patent Application No. 2016-123286 filed Jun. 22, 2016.

BACKGROUND

Technical Field

The present invention relates to an information processing apparatus, a non-transitory computer readable medium, and an information processing method.

SUMMARY

According to an aspect of the invention, there is provided an information processing apparatus including an archive file generation unit and a deriving unit. The archive file generation unit generates multiple archive files each including one or more pieces of document data and information regarding one or more processing functions. The one or more pieces of document data are each associated with the one or more processing functions. The information indicates one or more processes to be executed on the one or more pieces of document data. The deriving unit derives, from the multiple generated archive files, a common processing function among the processing functions that is common to the archive files and a piece of document data among the pieces of document data that is associated with the common processing function.

BRIEF DESCRIPTION OF THE DRAWINGS

Exemplary embodiments of the present invention will be described in detail based on the following figures, wherein:

FIG. 16 is a table for explaining the deriving operation performed on the third and fourth archive files;

FIG. 19 is a diagram illustrating another example display screen for the common operation performed on the first and second archive files.

DETAILED DESCRIPTION

Exemplary embodiments of the invention will be described in detail with reference to the drawings.

Figure 1:
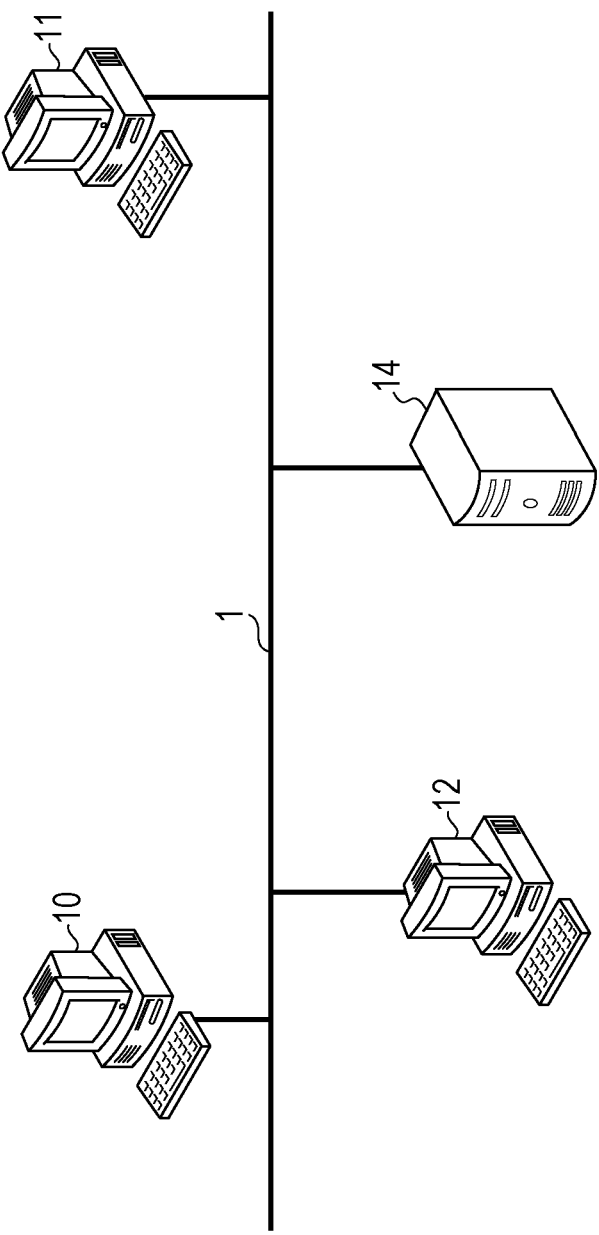
FIG. 1 is a diagram illustrating the configuration of a document management system according to an exemplary embodiment of the invention.

FIG. 1 is a diagram illustrating the system configuration of a document management system according to an exemplary embodiment of the invention.

As illustrated in FIG. 1, the document management system according to the exemplary embodiment of the invention includes information processing apparatuses 10, 11, and 12, such as personal computers, and a server apparatus 14 that are mutually connected through a network 1.

The information processing apparatuses 10 to 12 each have document editing software installed therein. The document editing software enables document data to be edited and generated.

The information processing apparatuses 10 to 12 may generate archive files (described later).

The information processing apparatuses 10 to 12 may also mutually transmit, receive, browse, and modify the document data and the archive files that are thus generated.

The server apparatus 14 is connected to the information processing apparatuses 10 to 12 through the network 1 and is designed to store the archive files and data generated by the information processing apparatuses 10 to 12. The information processing apparatuses 10 to 12 are designed to read out the data and the archive files stored in the server apparatus 14 and thereby to exchange the data and the archive files through the server apparatus 14.

Figure 2:
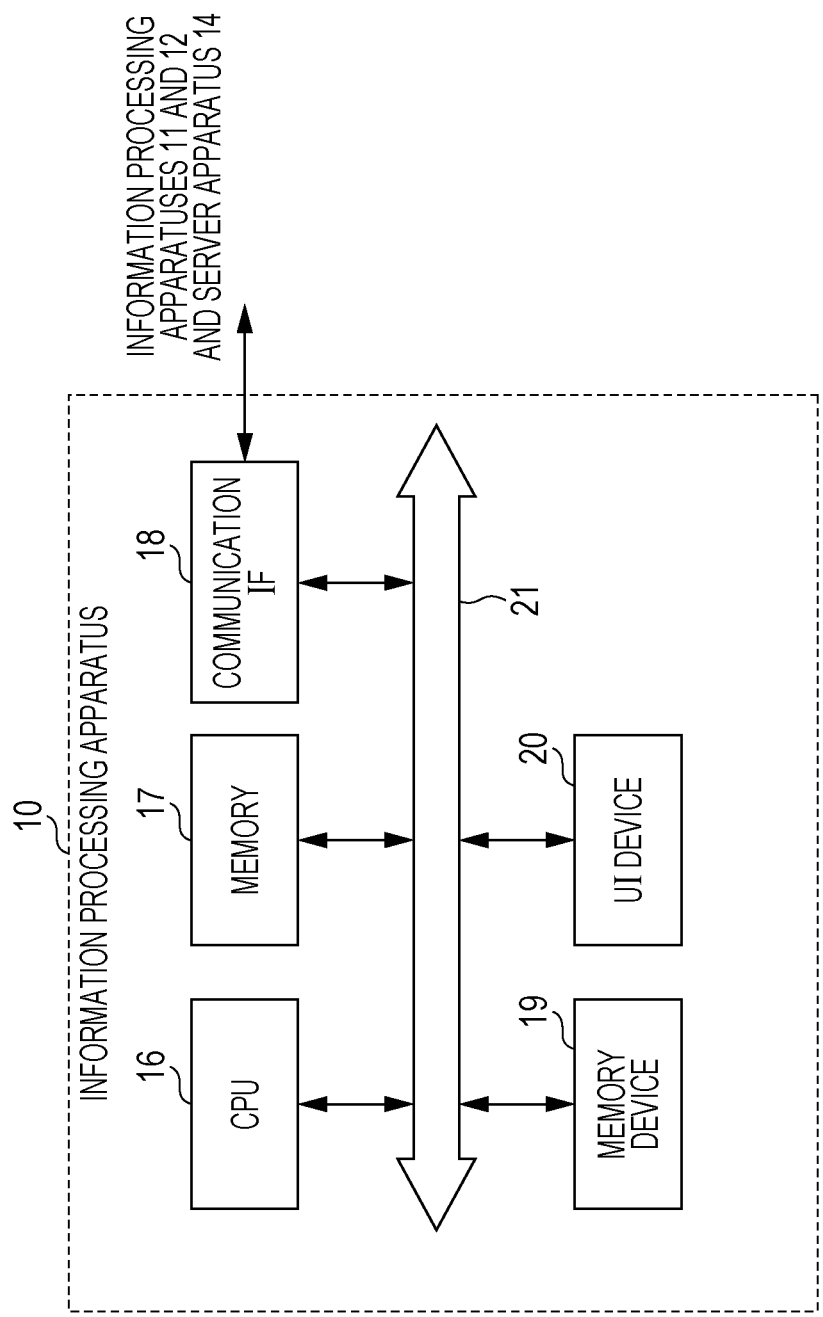
FIG. 2 is a block diagram illustrating the hardware configuration of the information processing apparatus according to the exemplary embodiment of the invention.

FIG. 2 illustrates the hardware configuration of the information processing apparatus 10 in the document management system according to the exemplary embodiment. The information processing apparatuses 11 and 12 have the same configuration as that of the information processing apparatus 10, and explanation thereof is omitted.

As illustrated in FIG. 2, the information processing apparatus 10 includes a central processing unit (CPU) 16, a memory 17, a communication interface (IF) 18 that exchanges data with an external apparatus or other apparatuses through the network 1, a memory device 19 such as a hard disk drive (HDD), and a user interface (UI) device 20 including a keyboard and either a touch panel or a liquid crystal display. These components are mutually connected through a control bus 21.

The CPU 16 executes predetermined processes in accordance with a control program stored in the memory 17 or the memory device 19 and thereby controls the operation of the information processing apparatus 10. Note that in the description in the exemplary embodiment, the CPU 16 reads and runs the control program stored in the memory 17 or the memory device 19, but the program may be provided for the CPU 16 with being stored in a storage medium such as a compact disc read-only memory (CD-ROM).

Figure 3:
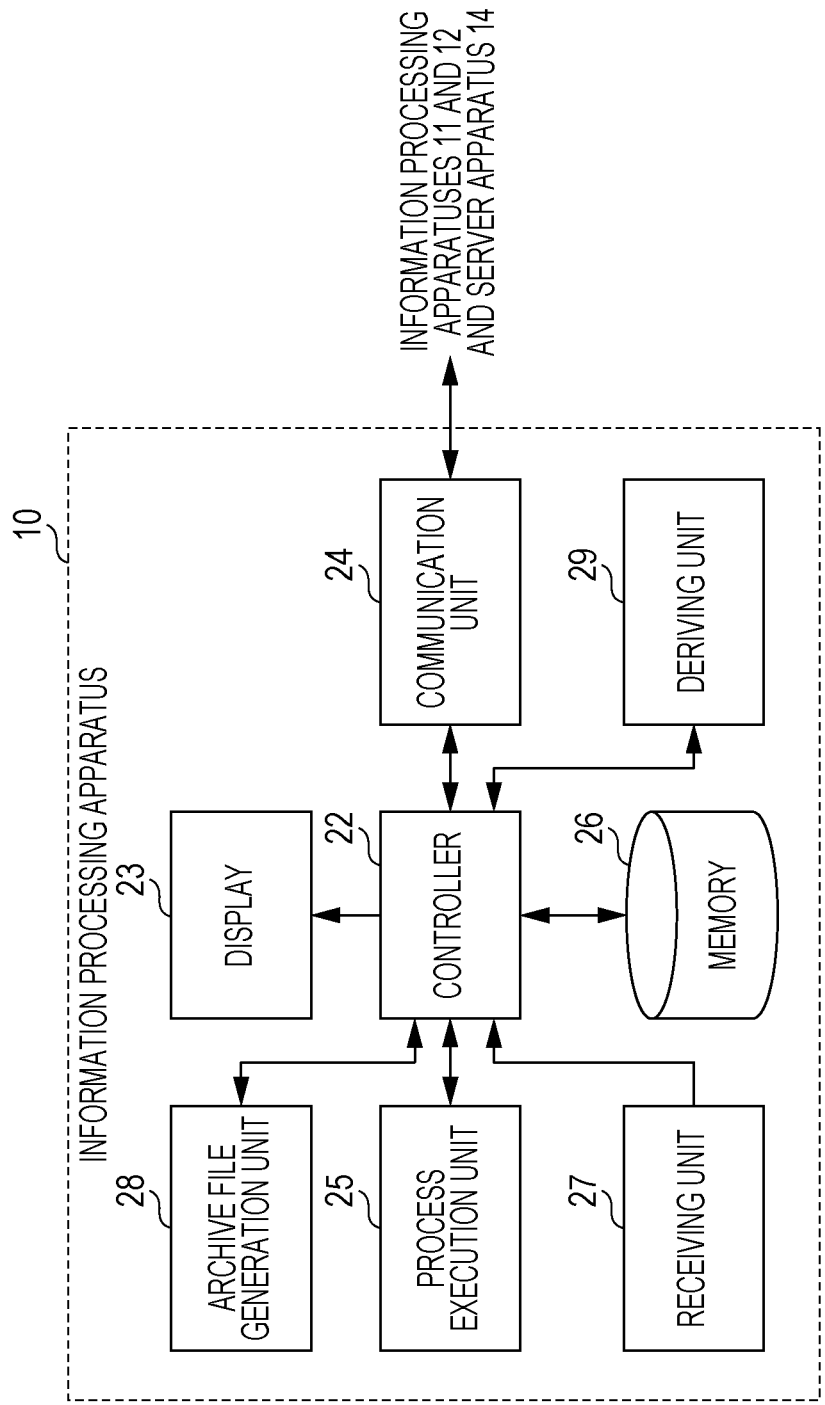
FIG. 3 is a block diagram illustrating the functional configuration of the information processing apparatus according to the exemplary embodiment of the invention.

FIG. 3 is a block diagram illustrating the configuration of the functions of the information processing apparatus 10 implemented by running the control program.

As illustrated in FIG. 3, the information processing apparatus 10 according to the exemplary embodiment includes a controller 22, a display 23, a communication unit 24, a process execution unit 25, a memory 26, a receiving unit 27, an archive file generation unit 28, and a deriving unit 29.

The receiving unit 27 receives designation of not only document data and an archive file but also a tool (processing function) to be executed on the document data.

Multiple tools may be associated with document data and stored in the memory 26. In this case, when receiving the designation of a page as the document data, the receiving unit 27 receives the designation of one or more tools to be displayed among the tools stored in the memory 26.

The memory 26 stores information regarding the one or more tools, the information indicating one or more processes to be executed on the document data. The memory 26 also associates the document data received by the receiving unit 27 with the tools received by the receiving unit 27 and one or more tools having been executed on the document data and stores the document data and the tools.

The display 23 displays information regarding the document data, the tools, and the like, under the control of the controller 22.

Under the control of the controller 22, the communication unit 24 communicates with the information processing apparatuses 11 and 12, the server apparatus 14, and other apparatuses and exchanges document data, archive files, and various pieces of information.

The process execution unit 25 executes, on document data, a process corresponding to the tool received by the receiving unit 27. The process execution unit 25 also executes, on document data, a process corresponding to a common tool derived by the deriving unit 29 (described later).

When the receiving unit 27 receives the designation of document data that has already been designated, the controller 22 controls the display 23 to display tools associated with the designated document data and stored in the memory 26. Among the tools, a tool having executed is distinguished on the display.

When the tools are displayed, the controller 22 causes the executed tool to have a display form different from the display form of an unexecuted tool. For example, the controller 22 grays out the executed tool on the display.

Under the control of the controller 22, the archive file generation unit 28 communicates with the server apparatus 14 or other apparatuses and generates (outputs) a file in which one or more pieces of document data needed for executing a task, one or more tools needed for processing the one or more pieces of document data, and information regarding the order in which the tools are to be executed are collated. The file is hereinafter referred to as an archive file. In the archive file, the pieces of document data are associated with the tools and the information regarding the order.

When the archive file is received by the receiving unit 27 and expanded, the controller 22 controls the display 23 to display the one or more pieces of document data stored in the archive file and the one or more tools to be executed on the document data.

When the receiving unit 27 receives multiple archive files 30 selected by a user, the deriving unit 29 parses the received archive files 30 and derives one or more common tools each of which is an operation common to the archive files 30. Further, the deriving unit 29 derives document data on which the derived common tool is to be executed. If there are multiple common tools, the deriving unit 29 derives the multiple common tools.

When the deriving unit 29 derives the multiple common tools, the controller 22 controls the display 23 to display the tools arranged in the order in which the tools stored in association with the document data are to be executed.

The deriving unit 29 judges, for example, whether characters in the document data are arranged in a direction in which the characters are computer readable. If the characters are not arranged in the computer readable direction, the deriving unit 29 regards the document having the document data as an incorrectly oriented document and then derives the document data.

The deriving unit 29 also derives document data related to the document data on which the derived tools are to be executed.

The controller 22 controls the display 23 to display each common tool derived by the deriving unit 29 and the document data associated with the common tool.

The controller 22 also controls the display 23 to display the document data related to the document data associated with the common tool.

The controller 22 also controls the process execution unit 25 to execute, by using the common tool derived by the deriving unit 29, a process on the document data associated with the common tool.

After the process execution unit 25 executes the process, the controller 22 performs control to update the original document data with the result of the executed process.

The controller 22 also performs control to execute an orientation correction process to correctly orient the document having the document data derived by the deriving unit 29 regarded as being an incorrectly oriented document.

Figure 4:
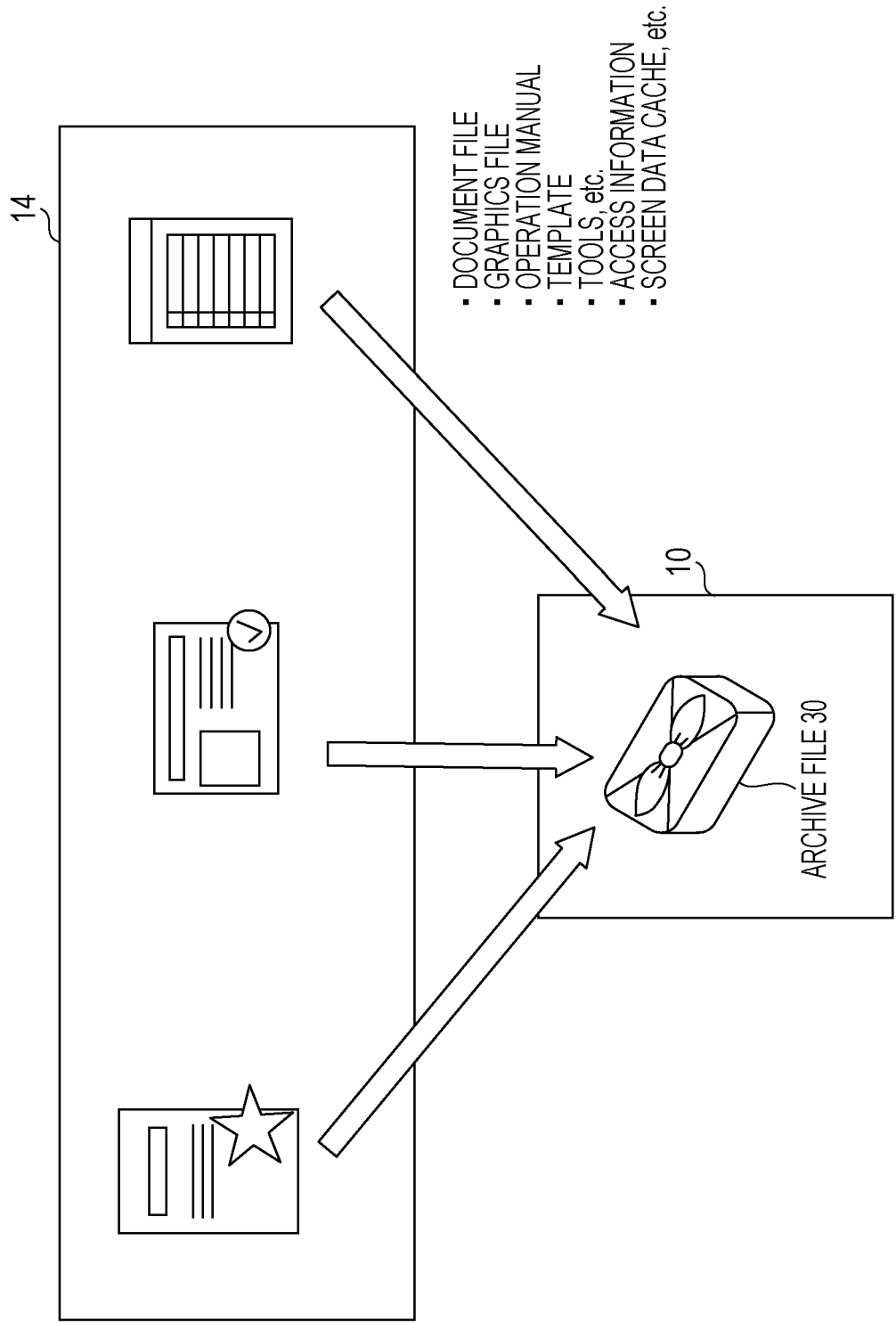
FIG. 4 is a diagram for explaining one of archive files in the exemplary embodiment of the invention.

The archive files 30 will be described in detail with reference to FIG. 4.

Each archive file 30 is a file including one or more pieces of document data needed for executing a task and one or more tools needed for processing the one or more pieces of document data. Multiple pieces of data in various data formats are collated in one file, that is, the archive file 30, and are thus made portable. Examples of the pieces of data include a document file (document data), a graphics file (graphics data), an operation manual, a related document, a template, a needed tool or a similar thing, information (access information) needed to access systems of the server apparatus 14 such as a uniform resource locator (URL) and user information, and a screen data cache (screen information). The archive file 30 is expanded by any of the information processing apparatuses 10 to 12, and document data for executing a task and a needed tool are thereby displayed on the display 23. If there are multiple tools, the order in which the tools are to be executed is displayed on the display 23. The user performs a user operation on a display screen, and a process may thereby be executed efficiently.

An example display screen displayed when the archive file 30 is expanded will be described in detail.

Figure 5:
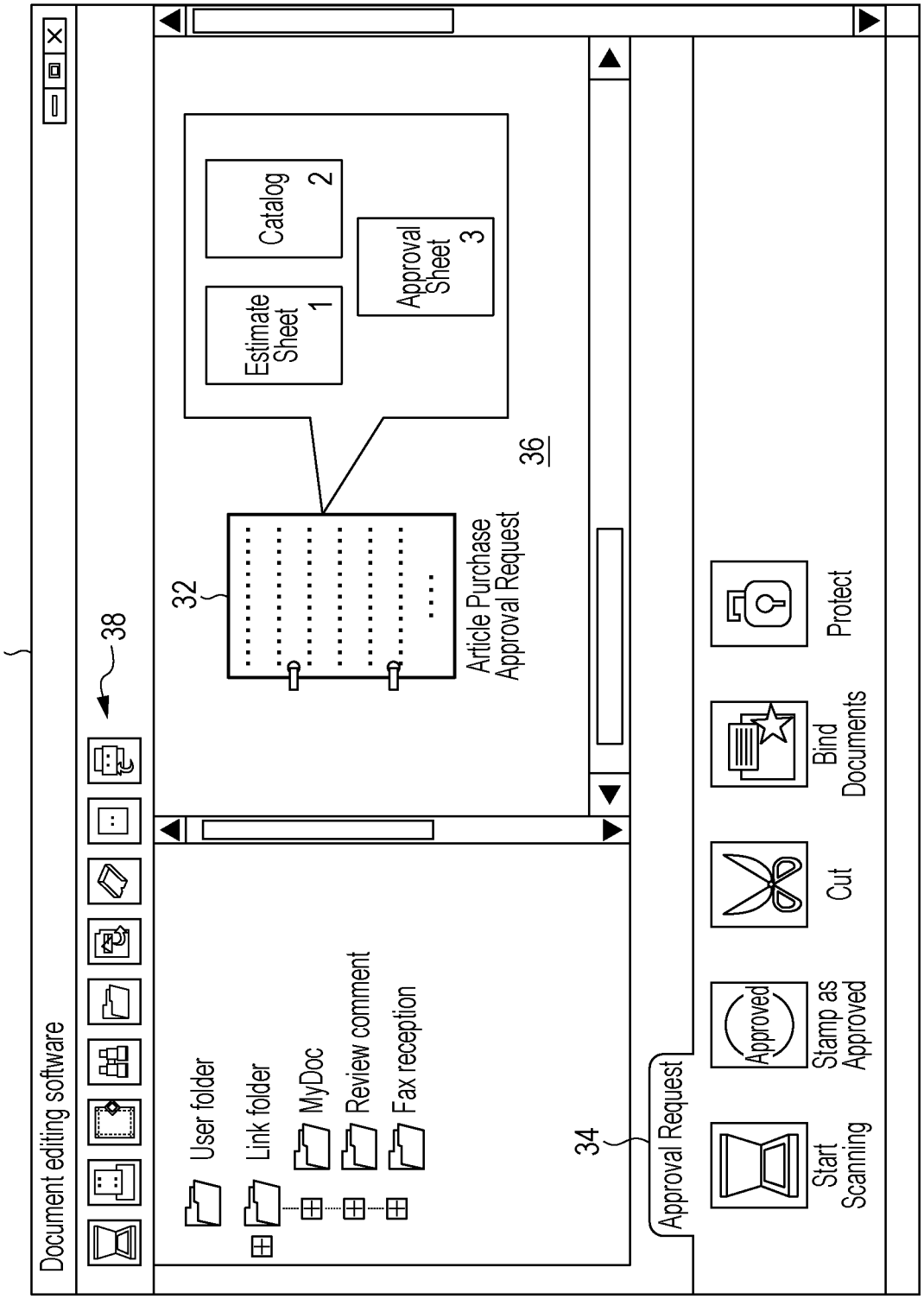
FIG. 5 is a diagram illustrating an example display screen displayed when a first archive file in the exemplary embodiment of the invention is expanded.

FIG. 5 illustrates an example display screen displayed when an archive file 30a used for purchasing an article is expanded and displayed on the display 23 of the information processing apparatus 10.

When the document editing software is run, various functions to be executed on document data are displayed as tools on a toolbar 38 on the display screen. Specifically, when the archive file 30a is expanded, the document editing software is started. Further, a binder 32 captioned "Article Purchase Approval Request" is displayed in a workspace 36, and a tool group 34 captioned "Approval Request" to be executed on the binder 32 is set and displayed separately from the toolbar 38. In FIG. 5, tools of "Start Scanning", "Stamp as Approved", "Cut", "Bind Documents", and "Protect" are set in the tool group 34. Note that the execution order in which the tools are to be executed one after another from the leftmost tool is set in the tool group 34.

The binder 32 also includes multiple pieces of document data that include "Estimate Sheet" on the first page, "Catalog" on the second page, and "Approval Sheet" on the third page. Note that to explain the binder 32, FIG. 5 illustrates the pieces of document data on the respective pages. However, the pieces of document data are actually initially displayed in such a manner as to be bound together in the binder 32. Subsequently, when a process of expanding the binder 32 is executed, the pieces of document data on the respective pages are thereby displayed.

Figure 6:
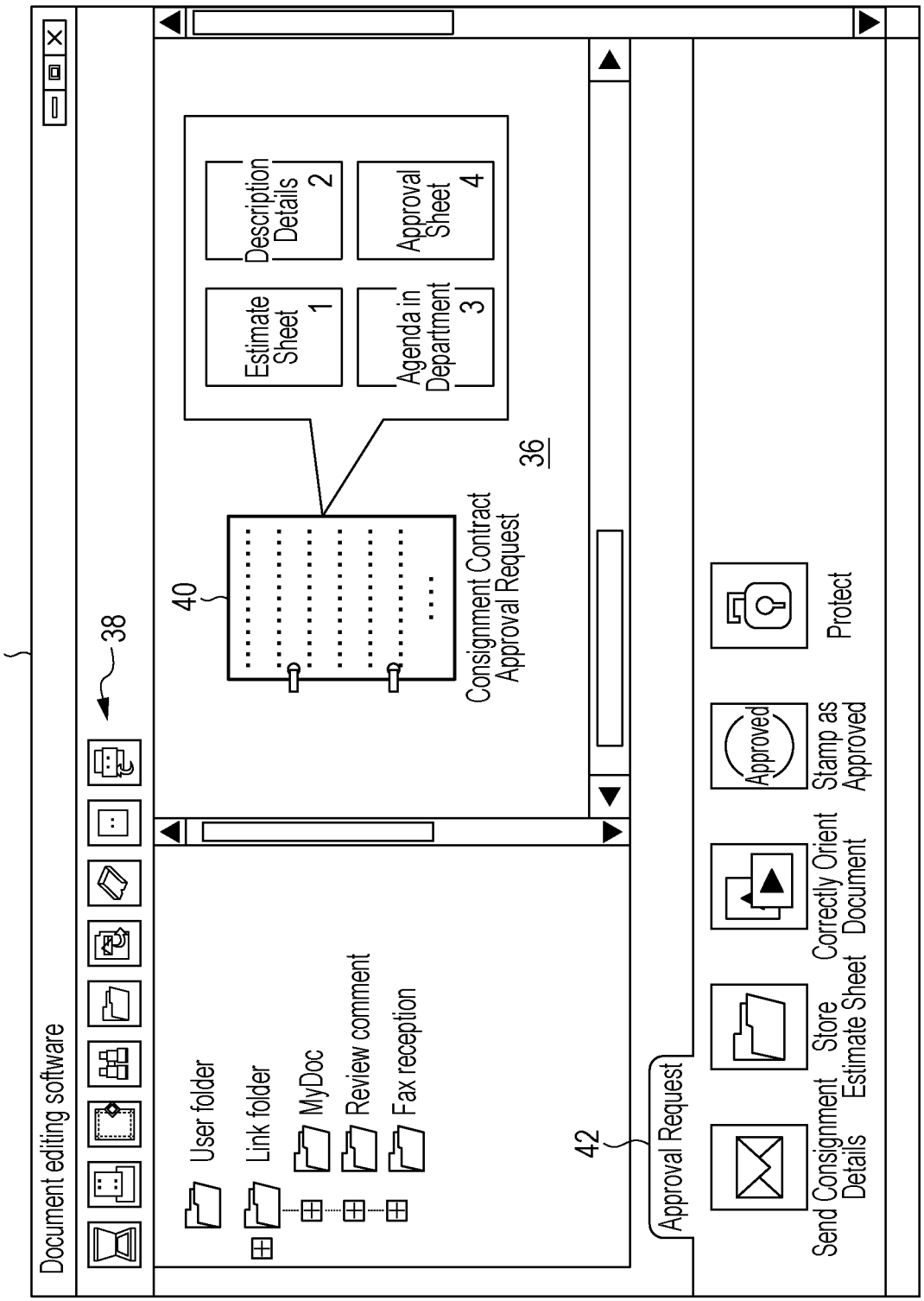
FIG. 6 is a diagram illustrating an example display screen displayed when a second archive file in the exemplary embodiment of the invention is expanded.
Figure 7:
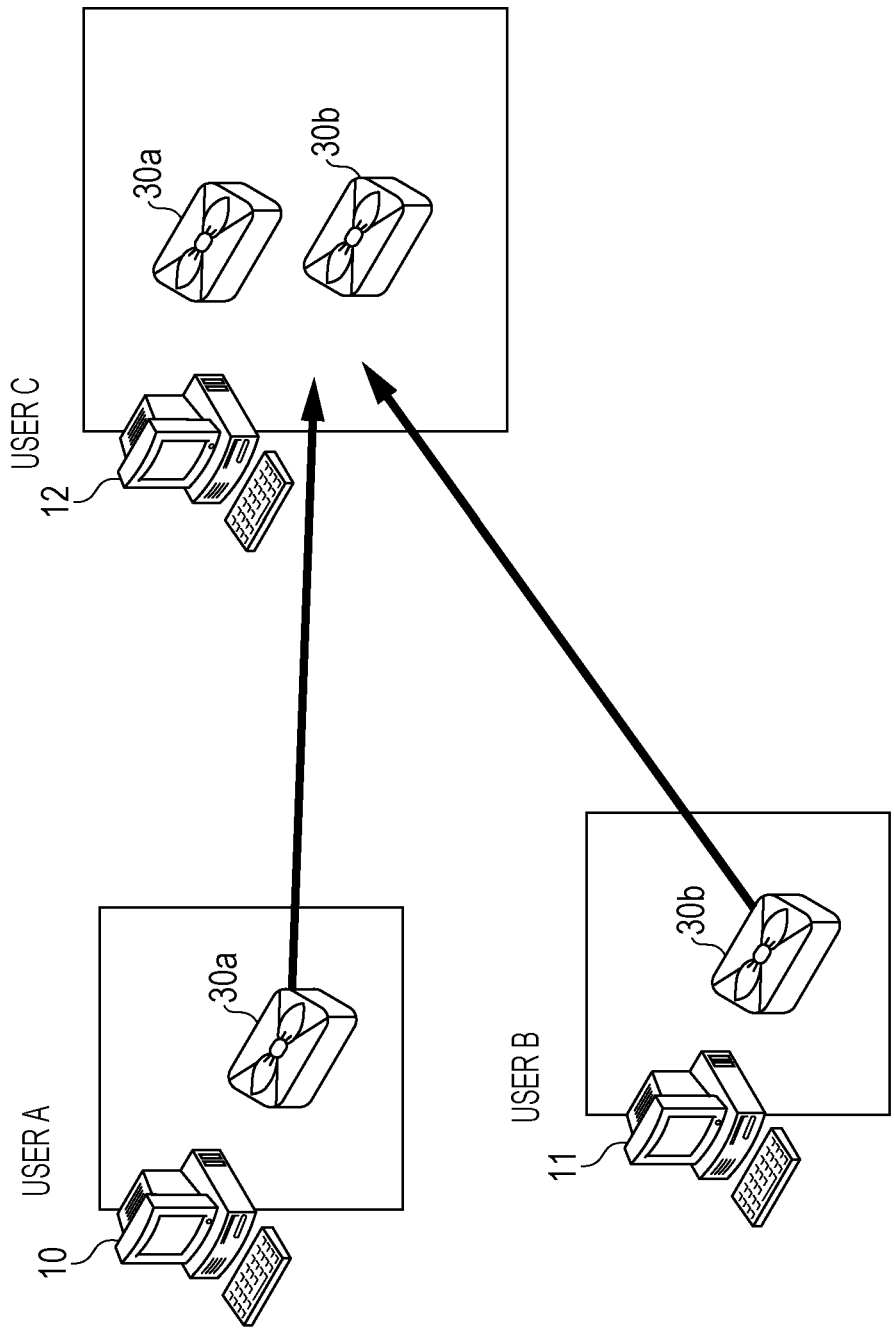
FIG. 7 is a diagram for explaining the configuration of the document management system according to the exemplary embodiment of the invention.
Figure 8:
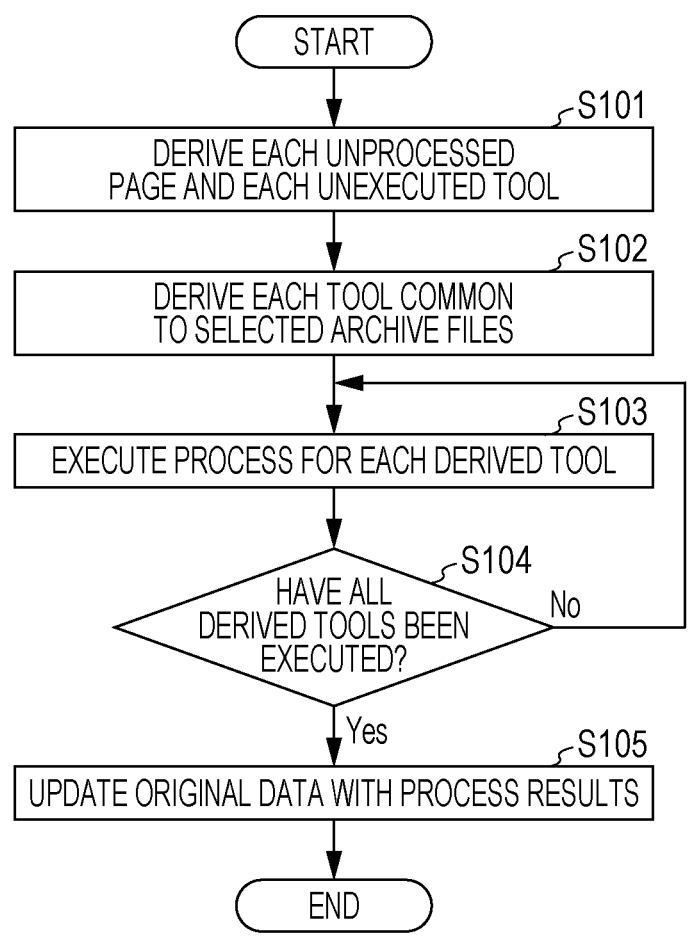
FIG. 8 is a flowchart for explaining a deriving operation performed by the information processing apparatus.

FIG. 6 illustrates an example display screen displayed when an archive file 30b used for a consignment contract is expanded and displayed by the display 23 of the information processing apparatus 10.

When the archive file 30b is expanded, the document editing software is started in the same manner as for the archive file 30a. A binder 40 captioned "Consignment Contract Approval Request" is displayed in the workspace 36, and a tool group 42 captioned "Approval Request" to be executed on the binder 40 is set and displayed separately from the toolbar 38. In FIG. 6, tools of "Send Consignment Details", "Store Estimate Sheet", "Correctly Orient Document", "Stamp as Approved", and "Protect" are set in the tool group 42. Note that the execution order in which the tools are to be executed one after another from the leftmost tool is set in the tool group 42.

The binder 40 also includes multiple pieces of document data that include "Estimate Sheet" on the first page, "Description Details" on the second page, "Agenda in Department" on the third page, and "Approval Sheet" on the fourth page. Note that to explain the binder 40, FIG. 6 illustrates the pieces of document data on the respective pages, like FIG. 5. However, the pieces of document data are actually initially displayed in such a manner as to be bound together in the binder 40. When a process of expanding the binder 40 is executed, the pieces of document data on the respective pages are thereby displayed.

How the information processing apparatuses 10 to 12 operate when one or more operations common to the archive files 30a and 30b are derived will be described with reference to FIGS. 7 to 13.

The common operations will be described by taking an example where a user A and a user B respectively transmit, to the information processing apparatus 12, the archive files 30a and 30b respectively generated by using the information processing apparatuses 10 and 11 and where a user C performs the common operations by using the information processing apparatus 12.

First, the user C selects and expands multiple files, that is, the archive files 30a and 30b.

The deriving unit 29 derives one or more unprocessed pages and one or more unexecuted tools in the archive file 30a and one or more unprocessed pages and one or more unexecuted tools in the archive file 30b (step S101). Note that the deriving unit 29 may derive, as the unprocessed page, a page not being subjected to editing by the information processing apparatus 12 or a page not being subjected to browsing by the information processing apparatus 12. The deriving unit 29 may also derive, as the unexecuted tool, a tool not being executed by the information processing apparatus 12.

Figure 9:
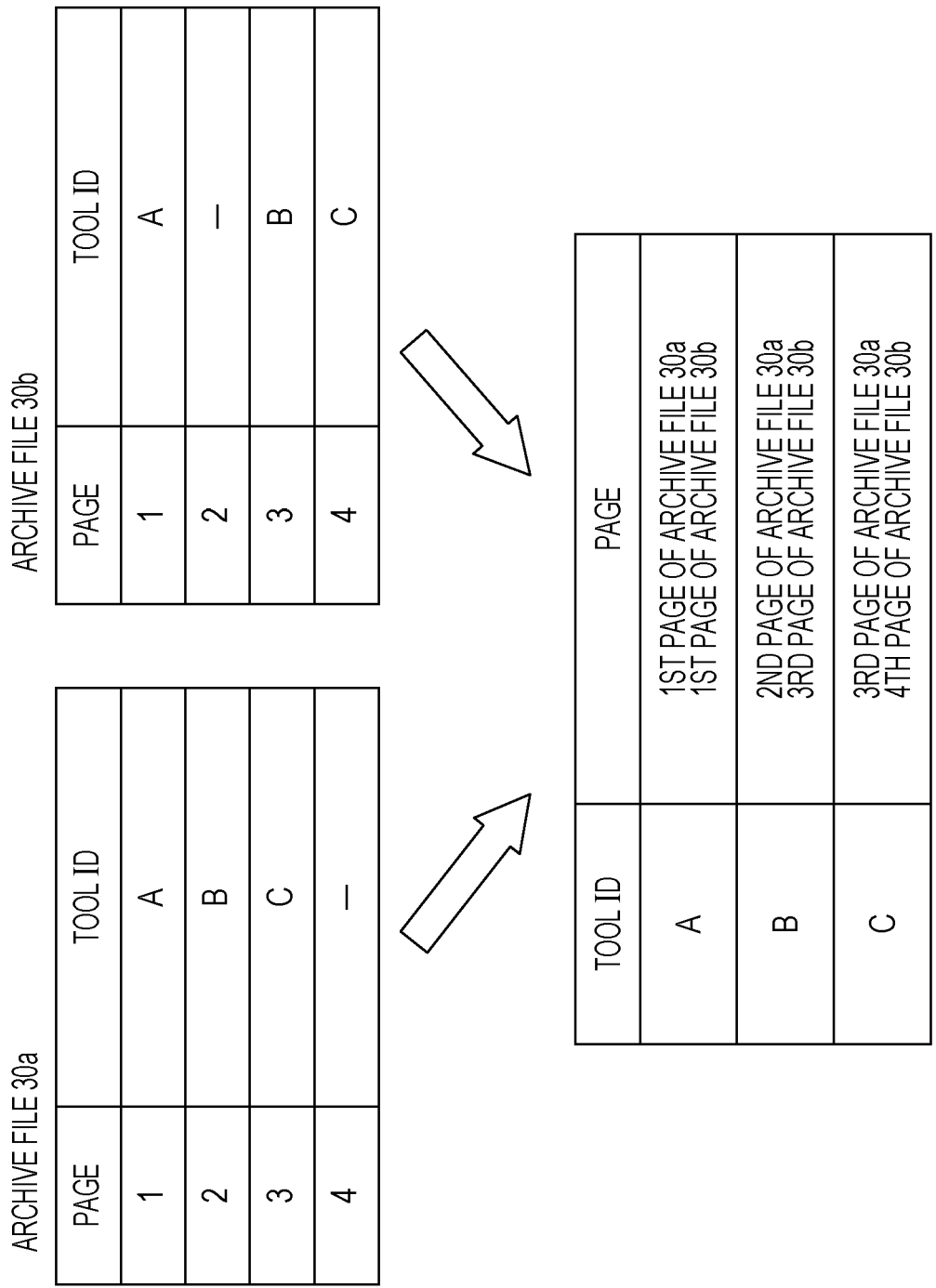
FIG. 9 is a diagram for explaining the deriving operation performed by the information processing apparatus.

FIG. 9 is a diagram illustrating example attribute tables of the tools for the archive files 30a and 30b on a per page basis (on a per document data basis). Numbers assigned to the pages of the binder 32 of the archive file 30a and tool identifiers (IDs) serving as tool information are stored in association with each other. Likewise, numbers assigned to the pages of the binder 40 of the archive file 30b and tool identifiers are stored in association with each other. Note that the association between each tool and the corresponding page in storing the tool and the page is performed based on whether a tool execution target is present on the page. For example, whether an area for an approval stamp is provided on the page is judged for the tool "Stamp as Approved". If the approval stamp area is provided, the tool is associated with the page. In addition, the association of the tool "Correctly Orient Document" with the page is performed based on whether characters on the page are arranged in a computer readable direction.

One or more common tools in the archive files 30a and 30b are derived (step S102), and pages (document data) of the respective archive files 30a and 30b are derived, the pages each being associated with one of the common tools.

Figure 10:
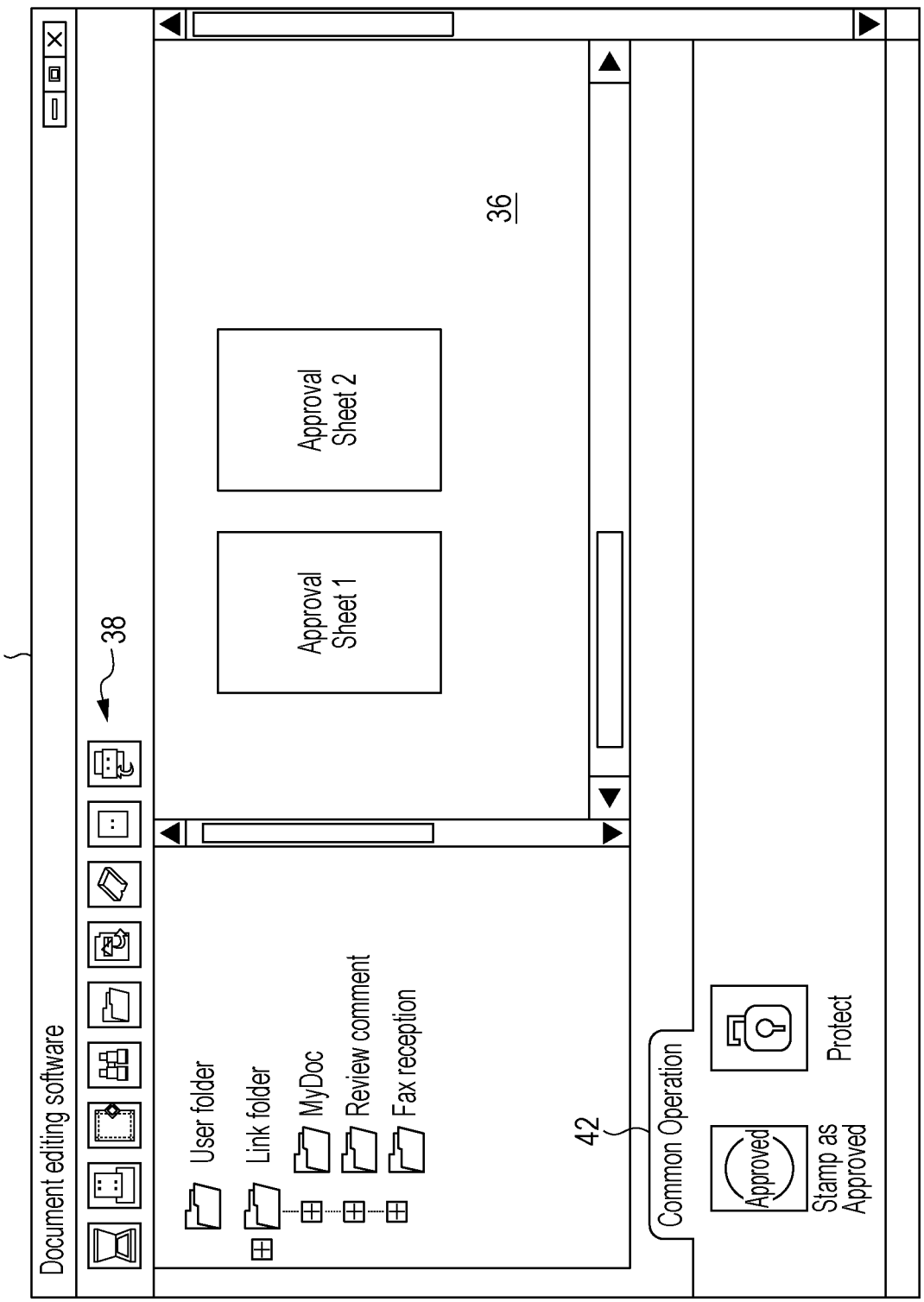
FIG. 10 is a diagram illustrating an example display screen for common operations to be performed by the information processing apparatus.

FIG. 10 is a diagram illustrating an example display screen displayed when multiple files, that is, the archive files 30a and 30b are selected and expanded.

When the archive files 30a and 30b are selected and expanded, the tools common to the archive files 30a and 30b and the pages each of which is associated with the corresponding common tool are displayed on the display screen. In this case, the common tools "Stamp as Approved" and "Protect" common to the archive files 30a and 30b are derived and set in the tool group 42 captioned "Common Operation". In the workspace 36, "Approval Sheet" (hereinafter, referred to as Approval Sheet 1 on the common-operation display screen) on the third page of the archive file 30a and "Approval Sheet" (hereinafter, referred to as Approval Sheet 2 on the common-operation display screen) on the fourth page of the archive file 30b are displayed. The pages are derived in association with the common operations derived for the tool group 42.

In accordance with the user's designation, the process execution unit 25 executes each of processes for the corresponding tool on the derived pages (step S103). In this case, the leftmost tool "Stamp as Approved" in the tool group 42 is executed on Approval Sheet 1 and Approval Sheet 2 respectively derived from the archive file 30a and the archive file 30b as illustrated in FIG. 10. In other words, an operation common to the archive files 30*a* and 30*b* is performed on one display screen. The controller 22 causes the display 23 to gray out a tool button for the executed tool on the display to indicate, to the user, the tool has been executed.

Figure 11:
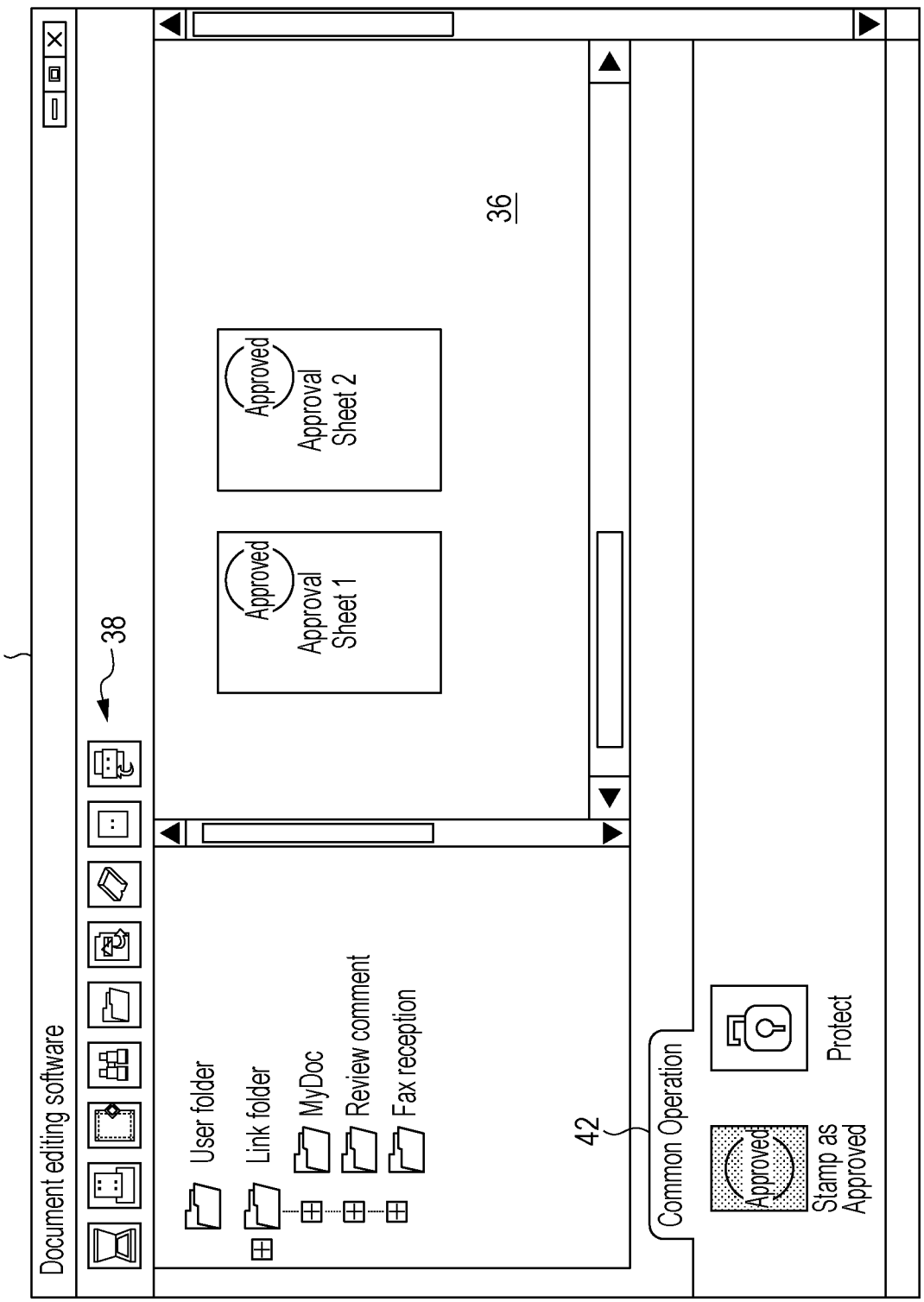
FIG. 11 is a diagram illustrating an example display screen for the common operations to be performed by the information processing apparatus.

It is judged whether all of the processes for the derived tools have been executed (step S104). If all of the processes have been executed (YES in step S104), the processing proceeds to step S105. If there is any unexecuted process of the tool (NO in step S104), the processing returns to step S103. In this case, the tool "Protect" subsequent to "Stamp as Approved" as illustrated in FIG. 11 is executed.

Figure 12:
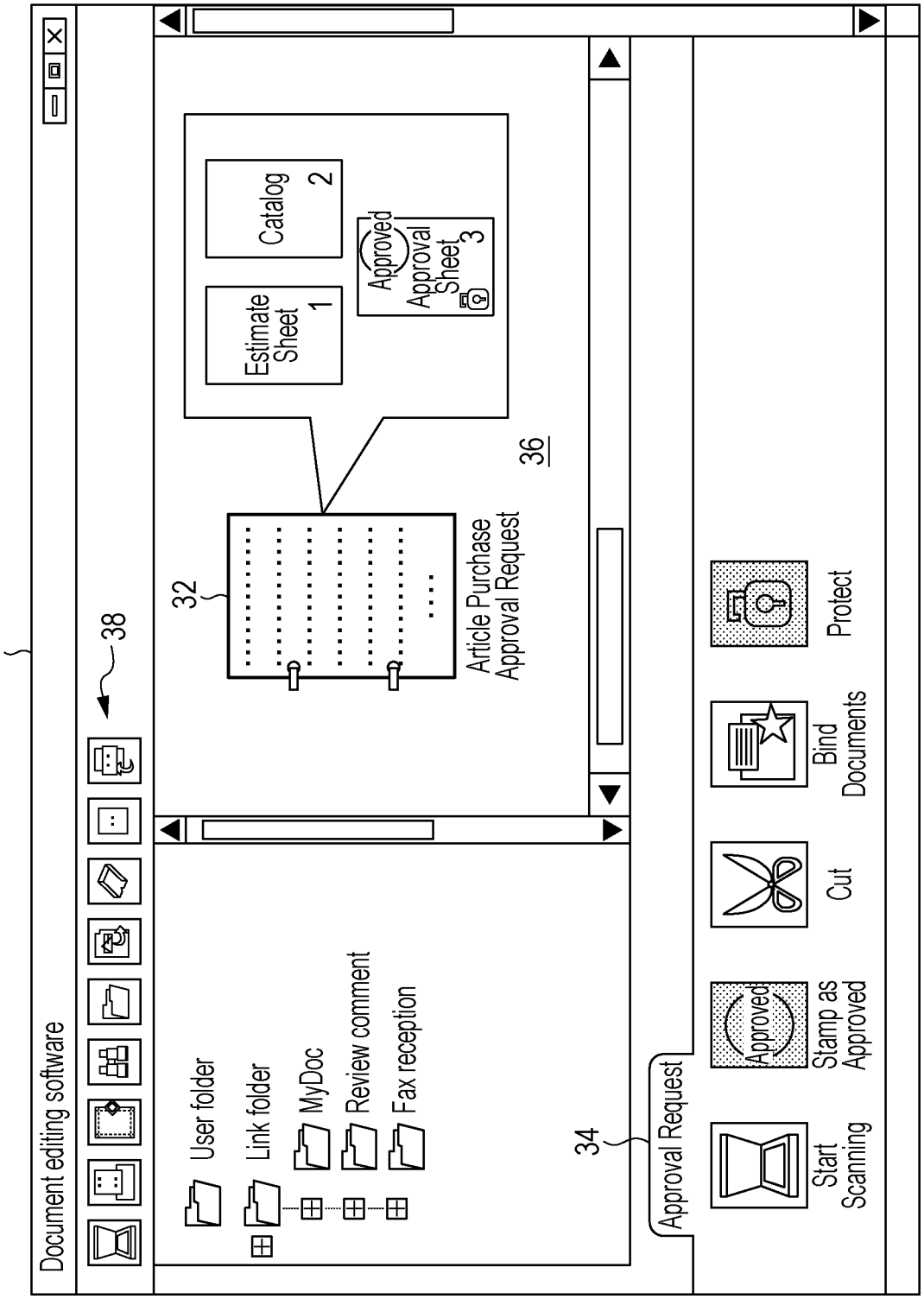
FIG. 12 is a diagram illustrating an example display screen for the first archive file displayed after the common operations are performed.
Figure 13:
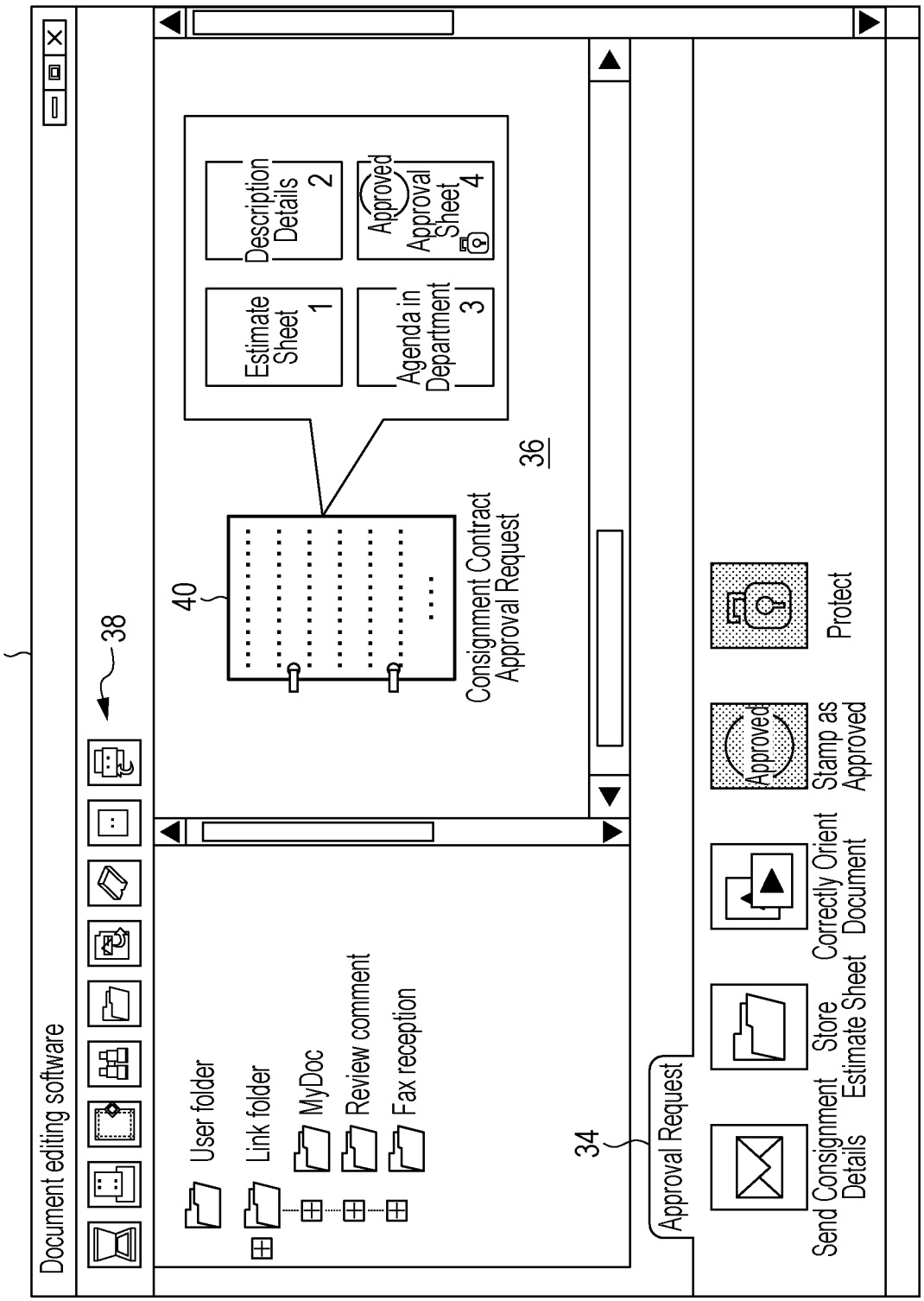
FIG. 13 is a diagram illustrating an example display screen for the second archive file displayed after the common operations are performed.

After all of the processes for the derived tools are executed, the archive files 30*a* and 30*b* are updated with the results of the processes (step S105). In this case, when the screen for executing the common operations is closed, each page of the archive files 30*a* and 30*b* is thereby updated with the corresponding process result as illustrated in FIG. 12 and FIG. 13.

That is, if the multiple archive files 30 generated by multiple users such as the users A, B, and C are transmitted to one information processing apparatus, one or more common operations included in the archive files 30 are performed on one display screen of the one information processing apparatus.

Another exemplary embodiment of the invention will be described with reference to FIGS. 14 to 18.

In the description of the exemplary embodiment, a case where an estimate sheet is received by multiple fax machines when an article is to be purchased and where a reception confirmation process is executed by the information processing apparatus 12 is taken as an example. In this case, common operations are performed on an archive file 30*c* and an archive file 30*d* that each include a catalog and the estimate sheet that are document data and tools for the document data.

Figure 14:
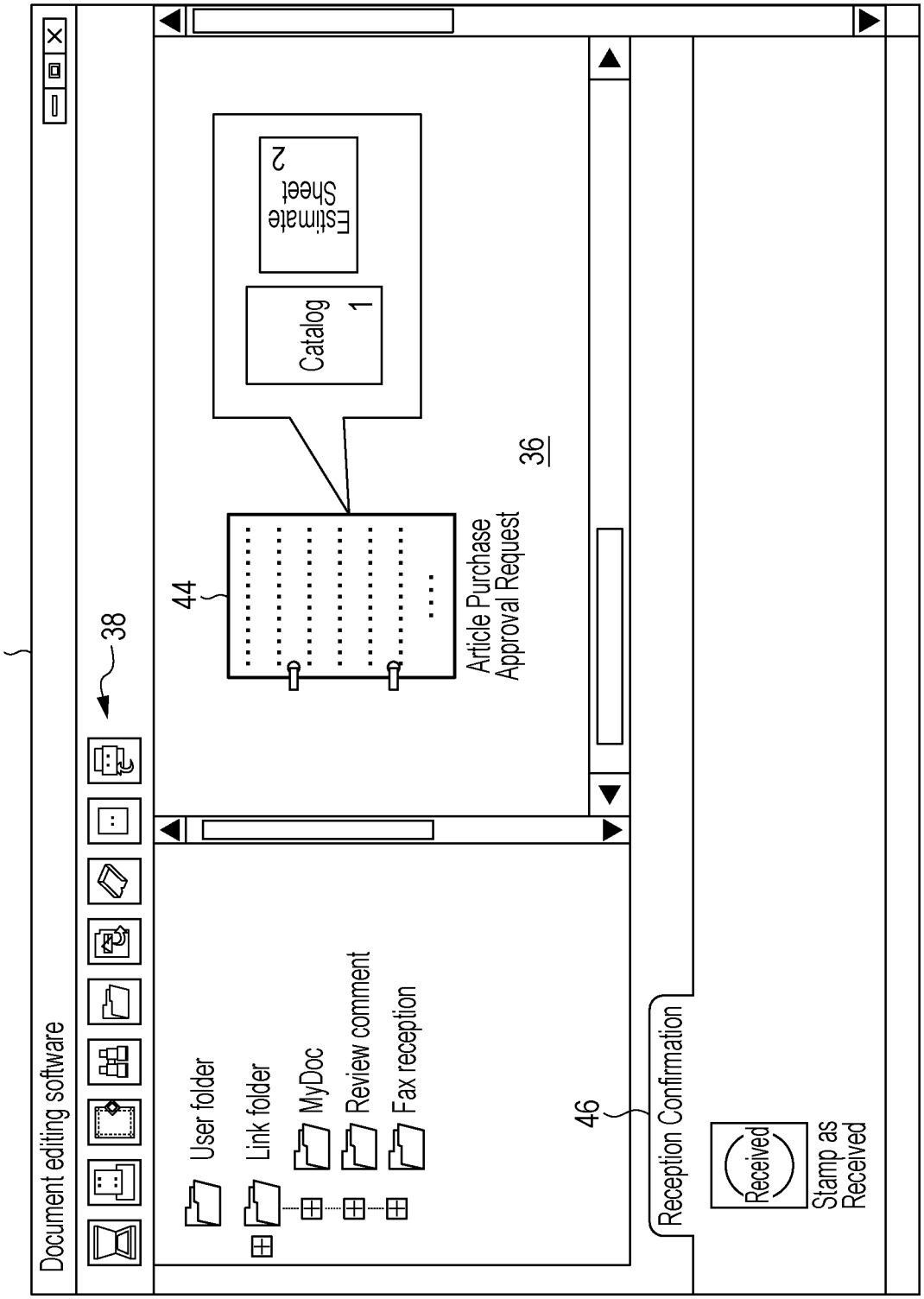
FIG. 14 is a diagram illustrating an example display screen displayed when a third archive file in the exemplary embodiment of the invention is expanded.

FIG. 14 illustrates an example display screen displayed when the archive file 30*c* is expanded.

The example display screen in FIG. 14 illustrates the workspace 36 including a binder 44 captioned "Article Purchase Approval Request". The binder 44 has multiple pages corresponding to multiple pieces of document data that include "Catalog" on the first page and "Estimate Sheet" on the second page. Note that "Estimate Sheet" on the second page is displayed to extend in a longitudinal direction for a reason such as the result of an operation performed when making a fax transmission or reception setting and is thus not correctly oriented.

The example display screen in FIG. 14 also illustrates a tool group 46 captioned "Reception Confirmation" that is set on the display screen. In FIG. 14, a tool "Stamp as Received" is set in the tool group 46.

Figure 15:
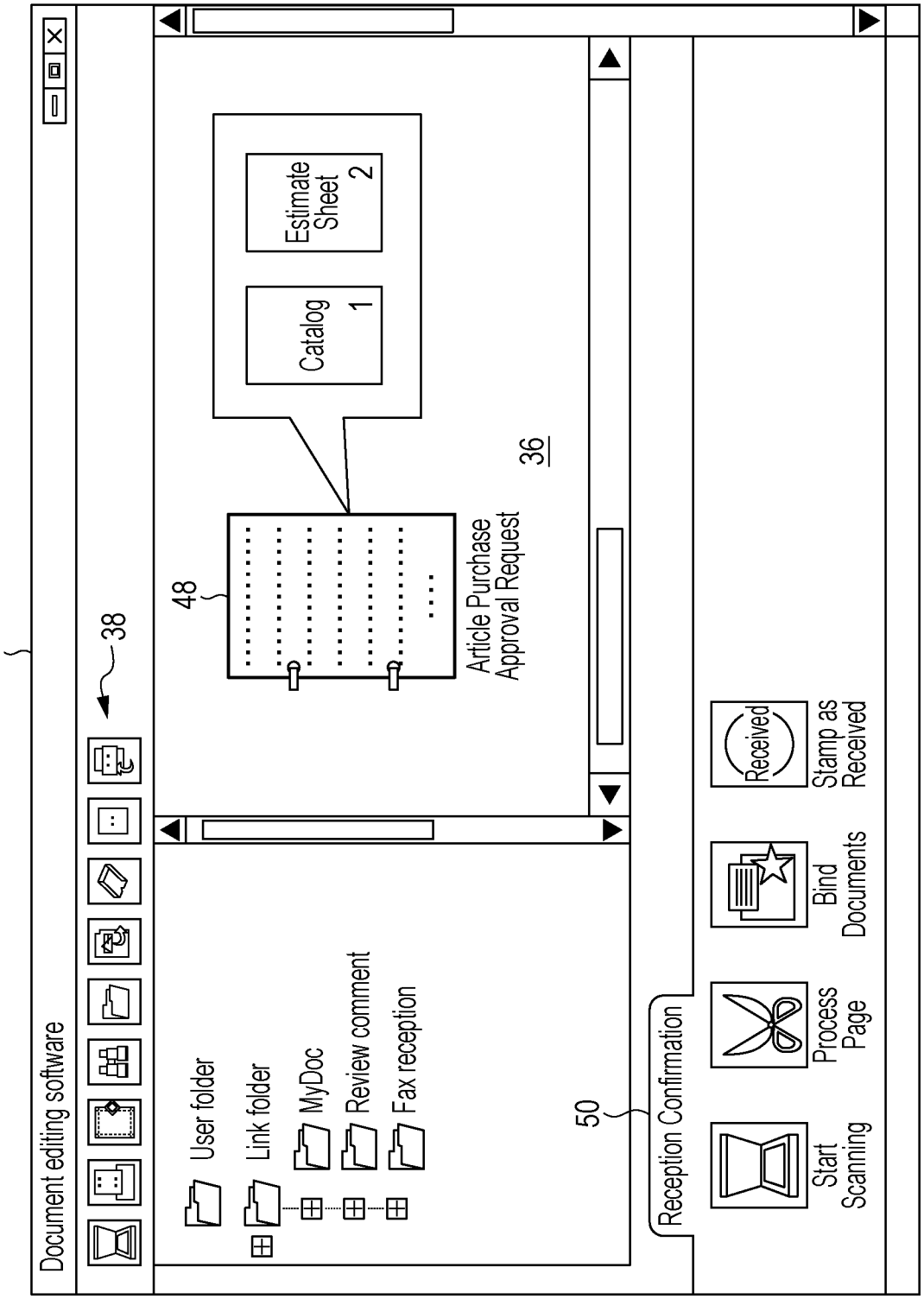
FIG. 15 is a diagram illustrating an example display screen displayed when a fourth archive file in the exemplary embodiment of the invention is expanded.

FIG. 15 illustrates an example display screen displayed when the archive file 30*d* is expanded.

The example display screen in FIG. 15 illustrates the workspace 36 including a binder 48 captioned "Article Purchase Approval Request". The binder 48 has multiple pages corresponding to multiple pieces of document data that include "Catalog" on the first page and "Estimate Sheet" correctly oriented on the second page. Further, the example display screen in FIG. 15 illustrates a tool group 50 captioned "Reception Confirmation" that is set on the display screen. In FIG. 15, tools "Start Scanning", "Process Page", "Bind Documents", and "Stamp as Received" are set in the tool group 50.

Figure 17:
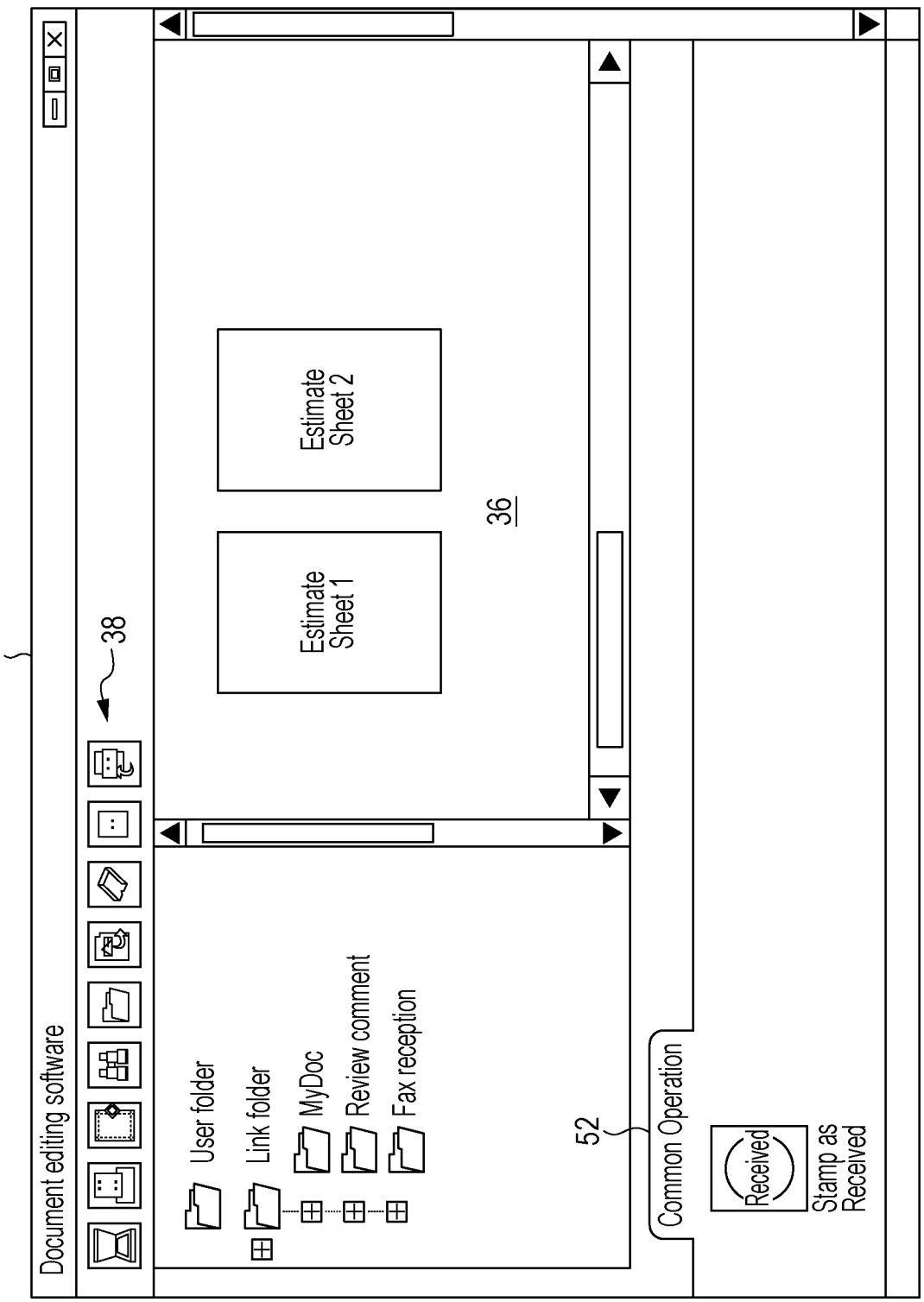
FIG. 17 is a diagram illustrating an example display screen for a common operation to be performed on the third and fourth archive files.
Figure 18:
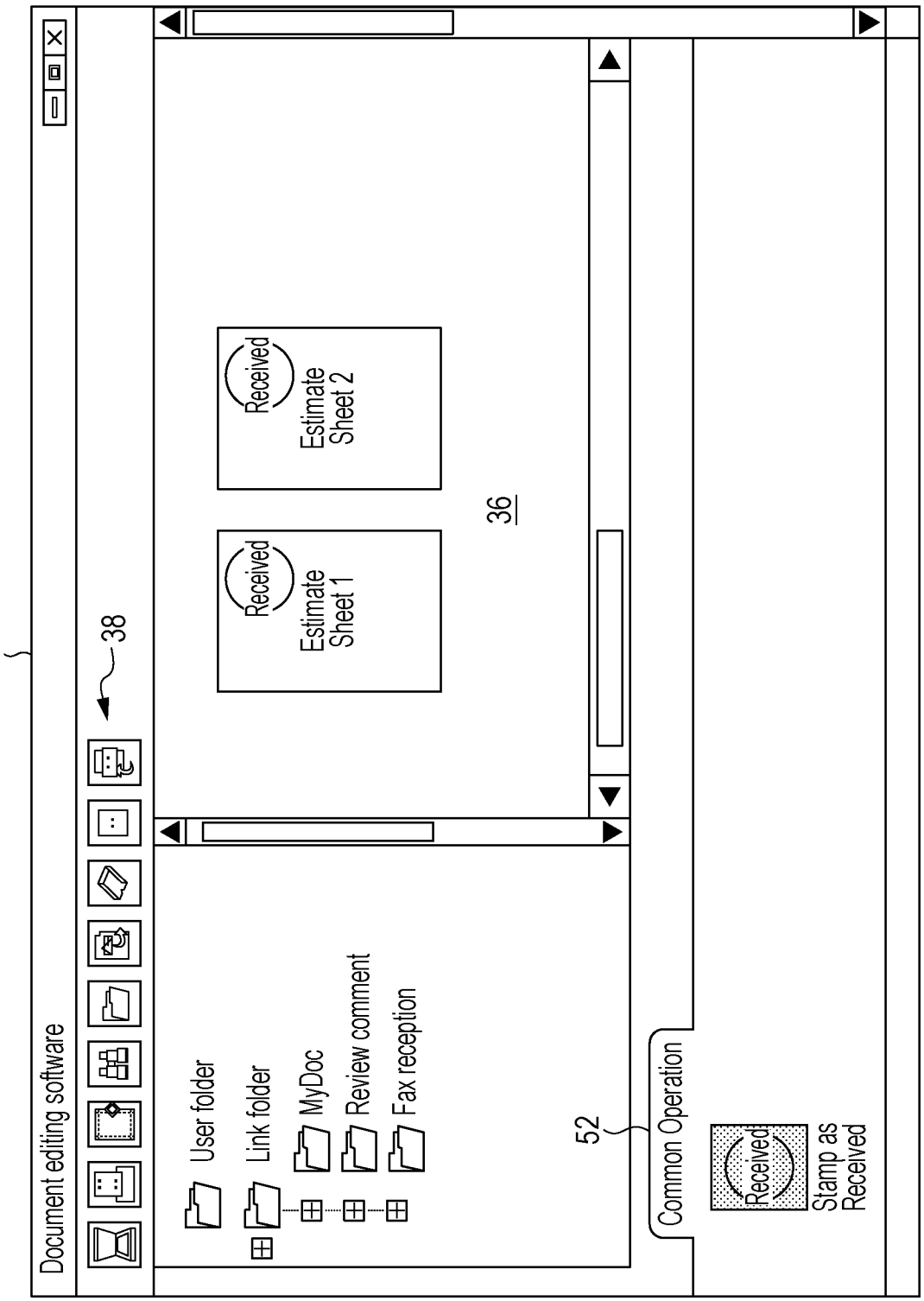
FIG. 18 is a diagram illustrating an example display screen for the common operation performed on the third and fourth archive files.

When multiple files that are the archive files 30*c* and 30*d* are selected and expanded in the information processing apparatus 12, a common tool and pages of the archive files 30*c* and 30*d* are derived, the pages each being associated with the common tool as illustrated in FIG. 16. That is, as illustrated in FIG. 17, a tool 52 "Stamp as Received" that is an operation common to the archive files 30*c* and 30*d* is derived and displayed. In addition, "Estimate Sheet" (Estimate Sheet 1 on common operation screens respectively illustrated in FIGS. 17 and 18) on the second page of the archive file 30*c* and "Estimate Sheet" (Estimate Sheet 2 on the common operation screens respectively illustrated in FIGS. 17 and 18) on the second page of the archive file 30*d* are derived and displayed. Estimate Sheets 1 and 2 have been associated with the tool 52 "Stamp as Received". To date, if an estimate sheet has been stored in the archive file 30*c* in such a manner as to extend in the longitudinal direction, the deriving unit 29 has derived the estimate sheet as data regarding an incorrectly oriented document, and the controller 22 has executed the orientation correction process. Subsequently, the common operation is performed on one display screen as illustrated in FIG. 18, and the original estimate sheet in the archive files 30*c* and 30*d* is updated with the operation result.

FIG. 19 illustrates another example display screen for an operation common to the archive files 30*a* and 30*b*.

In the description of the exemplary embodiment, the example where Approval Sheet 1 and Approval Sheet 2 are derived are taken as an example of deriving the operations common to the archive files 30*a* and 30*b*. However, when multiple files, that is, the archive files 30*a* and 30*b* are selected and expanded, document data related to the document data derived as the document data associated with one or more tools common to the archive files 30*a* and 30*b* may also be derived and displayed on the common operation screen. In this case, "Estimate Sheet" in the archive file 30*a* (Estimate Sheet 1 on the common operation screen illustrated in FIG. 19), that is, document data related to Approval Sheet 1 and "Estimate Sheet" (Estimate Sheet 2 on the common operation screen illustrated in FIG. 19) in the archive file 30*b*, that is, document data related to Approval Sheet 2 may be derived from the respective archive files 30*a* and 30*b* and displayed on the common operation screen. The details of Estimate Sheets 1 and 2 in the archive files 30*a* and 30*b* may be checked on the one screen, and a process such as putting an approval stamp on each of Approval Sheets 1 and 2 may be executed. In other words, the process may be executed while the details of the related documents are being checked on one screen.

The configuration in which the common operations derived from the multiple archive files 30 and pieces of document data associated with the common operations are displayed on the display 23 to execute processes has been in detail described in the exemplary embodiment. However, the configuration is not limited thereto. The processes may be executed in such a manner that the multiple archive files 30 are selected and that an execution screen is displayed, for example, after displaying an execution bar by right-clicking with the mouse.

Modification

The case where each exemplary embodiment of the invention is applied to the document editing software has been described in the exemplary embodiment. However, the exemplary embodiment is not limited thereto. The exemplary embodiment is also applicable to any software configured to perform an editing operation on document data or the like.

For example, the exemplary embodiment of the invention is applicable to not only software for editing document data with a personal computer but also software for editing document data with a mobile information terminal apparatus such as a smartphone or a tablet terminal apparatus.

In the exemplary embodiment, programs run by the information processing apparatus may be provided in such a manner as to be stored in a computer readable recording medium such as a magnetic recording medium (such as a magnetic tape or a magnetic disk (a HDD or a flexible disk (FD))), an optical recording medium (such as an optical disk (a compact disk (CD) or a digital versatile disk (DVD))), a magneto-optical recording medium, or a semiconductor memory (such as a flash ROM). The programs may also be downloaded through a network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
receive a first archive file that includes first document data, and information regarding one or more first processing functions associated with the first document data, the first document data including respective pages, which include multiple pieces of data in a plurality of different data formats collated into the first archive file,
wherein the information regarding the one or more first processing functions includes information regarding an order in which the first processing functions are to be executed;
receive a second archive file that includes second document data, and information regarding one or more second processing functions associated with the second document data, the second document data including respective pages, which include multiple pieces of data in a plurality of different data formats collated into the second archive file,
wherein the information regarding the one or more second processing functions includes information regarding an order in which the one or more second processing functions are to be executed;
derive, from the information regarding the one or more first processing functions associated with the first document data, and the information regarding the one or more second processing functions associated with the second document data, one or more common processing functions that are included in each of the one or more first processing functions and the one or more second processing functions;
when the first archive file and the second archive file are selected and expanded by a user, cause a display to display one or more respective pages of the first document data and the second document data that are common to each of the archive files, and information regarding the one or more common processing functions that are common to each of the archive files;
execute the one or more common processing functions on the first document data and the second document data associated with the one or more common processing functions; and
update a piece of first document data and a piece of second document data based on a result of the execution of the one or more common processing functions.

2. The information processing apparatus according to claim 1, wherein the information regarding the one or more processing functions displayed on the display is information for performing execution of the one or more processing functions.

3. A non-transitory computer readable medium storing a computer-executable program that, when executed by a computer to:
receive a first archive file that includes first document data, and information regarding one or more first processing functions associated with the first document data, the first document data including respective pages, which include multiple pieces of data in a plurality of different data formats collated into the first archive file,
wherein the information regarding the one or more first processing functions includes information regarding an order in which the first processing functions are to be executed;
receive a second archive file that includes second document data, and information regarding one or more second processing functions associated with the second document data, the second document data including respective pages, which include multiple pieces of data in a plurality of different data formats collated into the second archive file,
wherein the information regarding the one or more second processing functions includes information regarding an order in which the one or more second processing functions are to be executed;
derive, from the received archive files, information regarding the one or more first processing functions associated with the first document data, and the information regarding the one or more second processing functions associated with the second document data, one or more common processing functions that are included in each of the one or more first processing functions and the one or more second processing functions;
when the first archive file and the second archive file are selected and expanded by a user, cause a display to display one or more respective pages of the first document data and the second document data that are common to each of the archive files, and information regarding the one or more common processing functions that are common to each of the archive file,
execute the one or more common processing functions on the first document data and the second document data associated with the one or more common processing functions; and
update a piece of first document data and a piece of second document data based on a result of the execution of the one or more common processing functions.

4. An information processing method comprising:
receiving, by at least one processor, a first archive file that includes first document data, and one or more first processing functions associated with the first document data, the first document data including respective pages, which include multiple pieces of data in a plurality of different data formats collated into the first archive file, wherein the information regarding the one or more first processing functions includes information regarding an order in which the first processing functions are to be executed;

receiving, by the at least one processor, a second archive file that includes second document data, and one or more second processing functions associated with the second document data, the second document data including respective pages, which include multiple pieces of data in a plurality of different data formats collated into the second archive file, wherein the information regarding the one or more second processing functions includes information regarding an order in which the one or more second processing functions are to be executed;

deriving, by the at least one processor, from the received archive files, one or more common processing functions that are included in each of the one or more first processing functions and the one or more second processing functions;

when the first archive file and the second archive file are selected and expanded by a user, causing, by the at least one processor, a display to display one or more respective pages of the first document data and the second document data that are common to each of the archive files, and information regarding the one or more common processing functions that are common to each of the archive file, executing the one or more common processing functions on the first document data and the second document data associated with the one or more common processing functions; and updating a piece of first document data and a piece of second document data based on a result of the execution of the one or more common processing functions.

* * * * *